United States Patent
Li et al.

(10) Patent No.: US 6,703,339 B2
(45) Date of Patent: Mar. 9, 2004

(54) COMPONENTS AND CATALYSTS FOR THE (CO)POLYMERIZATION OF OLEFINS

(75) Inventors: Zhulan Li, Beijing (CH); Juxiu Yang, Beijing (CH); Mingzhi Gao, Beijing (CH); Yun Zhao, Beijing (CH); Bingquan Mao, Beijing (CH); Aichun Yang, Beijing (CH); Chunmin Ding, Beijing (CH); Wenbo Song, Beijing (CH); Kunzheng Liu, Beijing (CH)

(73) Assignees: China Petro-Chemical Corporation, Beijing (CN); Beijing Research Institute of Chemical Industry, Sinopec, Beijing (CN)

( * ) Notice: Subject to any disclaimer, the term of this patent is extended or adjusted under 35 U.S.C. 154(b) by 321 days.

(21) Appl. No.: 09/732,523

(22) Filed: Dec. 6, 2000

(65) Prior Publication Data

US 2002/0010081 A1 Jan. 24, 2002

(30) Foreign Application Priority Data

Dec. 6, 1999 (CH) .......................... 99125567 A

(51) Int. Cl.$^7$ .................. B01J 31/00; B01J 37/00; C08F 4/02; C08F 4/60
(52) U.S. Cl. .................................. 502/127
(58) Field of Search ......................... 502/127

(56) References Cited

U.S. PATENT DOCUMENTS

| | | | | |
|---|---|---|---|---|
| 4,784,983 A | | 11/1988 | Mao et al. ............... | 502/111 |
| 4,861,847 A | * | 8/1989 | Mao et al. ............... | 526/125.3 |
| 6,111,038 A | * | 8/2000 | Kioka et al. ............. | 526/123.1 |
| 6,320,009 B1 | * | 11/2001 | Nakano et al. ........... | 526/351 |
| 6,376,417 B1 | * | 4/2002 | Yang et al. .............. | 502/121 |
| 2001/0025006 A1 | * | 9/2001 | Gao et al. ............... | 502/126 |

FOREIGN PATENT DOCUMENTS

| | | |
|---|---|---|
| CH | 85100997 | 1/1987 |
| CH | 1156999 | 8/1997 |

* cited by examiner

*Primary Examiner*—Mark L. Bell
*Assistant Examiner*—Jennine Brown
(74) *Attorney, Agent, or Firm*—Christie, Parker & Hale, LLP

(57) ABSTRACT

A catalyst component for the (co)polymerization of olefins is provided. The catalyst comprises titanium, magnesium halogen and a mixed electron-donor and a catalyst for the (co)polymerization of olefins comprising:(A) the catalyst component; (B) an organic aluminum compound; and (C) an organic silicon compound. A polymer with high and adjustable stereospecificity and broad molecular weight distribution can be prepared by using the catalyst.

20 Claims, No Drawings

COMPONENTS AND CATALYSTS FOR THE (CO)POLYMERIZATION OF OLEFINS

CROSS-REFERENCE TO RELATED APPLICATION

This application claims priority of China patent Application No. 99125567.4, filed on Dec. 6, 1999.

BACKGROUND OF THE INVENTION

The present invention relates to components and catalysts system for the (co)polymerization of olefins.

In recent years, a study of a catalyst for olefinic polymerization has been greatly developed and properties of the catalyst have been greatly improved. Meanwhile, olefinic polymerization catalysts with better properties are desired as the demand for the processability of the polymer product become higher and higher.

U.S. Pat. No. 4,784,983 discloses a catalyst system for olefinic polymerization comprising components (A), (B) and (C). Component (A) is prepared by dissolving a halide of magnesium in a solvent mixture of an organic epoxy compound and an organic phosphorus compound to form a homogeneous solution; mixing the homogeneous solution with a liquid halide of titanium; adding an auxiliary precipitant such as organic carboxylic acid anhydrides, organic carboxylic acids, ethers and ketones to form a precipitate; adding at least one polycarboxylic acid ester when the precipitate appears; and separating the precipitate from the mixture and treating the separated precipitate with the halide of titanium or a mixture of the halide of titanium in an inert diluent. The activity of the catalyst system of the patent is a very high. The resultant polymer using the catalyst system has very high stereospecificity and a narrow particle size distribution.

However, adjustment to stereospecificity of the polymer by changing the ratio of the organic aluminum compound to the organic silicon compound in the catalyst system of U.S. Pat. No. 4,784,983 is not ideal.

In some applications, there is a need for polymers with high and adjustable stereospecificity and broad molecular weight distribution.

Two attempts have been made to broaden the molecular weight of polymer: 1) The polymerization was carried out in multistage, 2) two or more external electron-donors were added in the polymerization system (see CN 1156999A). However, the production costs of two methods are very expensive.

A catalyst that can be used to produce the polymer with high and adjustable stereospecificity and broad molecular weight distribution would be highly desirous.

SUMMARY OF THE INVENTION

The present invention provides a catalyst component for the (co)polymerization of olefins comprising titanium, magnesium, halogen and a mixed electron-donor and prepared by dissolving a halide of magnesium in a solvent system consisting of an organic epoxy compound, an organic phosphorus compound and optionally an inert diluent to form a homogeneous solution; mixing the homogeneous solution with titanium tetrahalide or its derivatives to form a mixture; precipitating a solid from the mixture in the presence of at least one auxiliary precipitant; treating the solid with the mixed electron-donor to load the mixed electron-donor on the solid; and treating the mixed electron-donor loaded solid with titanium tetrahalide or its derivatives and the inert diluent.

The present invention also provides a catalyst for the (co)polymerization of olefins comprising:
 (A) A catalyst component described the above;
 (B) An organic aluminum compound having the formula $AlR_nX_{3-n}$ wherein each R is independently hydrogen or a hydrocarbyl group having 1–20 carbon atoms, X is a halogen, and n is a number of from 1 to 3; and
 (C) An organic silicon compound having the formula $R_{n'}Si(OR')_{4-n'}$ wherein n' is an integer of from 0 to 3; R and R' each is independently is alkyl, cycloalkyl, aryl, or haloalkyl group.

DETAILED DESCRIPTION OF THE INVENTION

The present invention is described in details as follows.

The halide of Magnesium solution, titanium tetrahalide or its derivatives and auxiliary precipitant have been disclosed in U.S. Pat. No. 4,784,983 which is incorporated herein by reference.

The halide of Magnesium solution herein means a uniform solution obtained by dissolving a halide of magnesium in a solvent system consisting essentially of organic epoxy compounds and organic phosphorus compounds. The solvent system may include inert diluents.

Suitable halide of magnesium includes magnesium halide such as magnesium chloride, magnesium bromide and magnesium iodide; a complex of magnesium halide with water or alcohol; a derivative of magnesium halide wherein a halogen atom is substituted by a hydrocarboxyl or halohydrocarboxyl group; and like.

Suitable organic epoxy compound includes oxides of aliphatic olefins, aliphatic diolefins, halogenated aliphatic olefins, and halogenated aliphatic diolefins, glycidyl ethers, cyclic ethers and the like having 2–8 carbon atoms. Examples of suitable organic epoxy compounds are ethylene oxide, propylene oxide, butylene oxide, butadiene dioxide, epoxy chloropropane, methylglycidyl ether, diglycidyl ether, tetrahydrofuran, and the like.

Suitable organic phosphorus compounds include hydrocarbyl or halohydrocarbyl esters of phosphoric acid or phosphorous acid, e.g. trimethyl phosphate, triethyl phosphate, tributyl phosphate, triphenyl phosphate, trimethyl phosphite, triethyl phosphite, tributyl phosphite, triphenyl phosphite and the like; with tributyl, phosphate being preferred.

The halide of titanium used in the preparation of the catalyst component of the invention is a compound having the formula $TiX_n(OR)_{4-n}$ wherein X is a halogen, each R is independently a hydrocarbyl and n is an integer of from 0 to 4. Examples of the compounds are titanium tetrachloride, titanium tetrabromide, titanium tetraiodide, tetrabutoxy titanium, tetraethoxy titanium, chlorotriethoxy titanium, dichlorodiethoxy titanium, trichloroethoxy titanium and the like.

The halide of magnesium solution and liquid titanium tetrahalide or its derivatives used in the present invention have been disclosed in U.S. Pat. No. 4,784,983 which is incorporated herein by reference.

The auxiliary precipitant according to this invention includes organic acid anhydrides, organic acids, ketones, aldehydes, ethers and any combination thereof, such as acetic anhydride, phthalic anhydride, succinic anhydride, maleic anhydride, pyromellitic dianhydride, acetic acid, propionic acid, butyric acid, acrylic acid, methacrylic acid, acetone, methyl ethyl ketone benzophenone, dimethyl ether, diethyl ether, dipropyl ether, dibutyl ether, diamyl ether and the like.

The mixed electron-donor used in the catalyst component of this invention consists of (1) an o-phthalic acid ester, and (2) a mono- or poly-carboxylic acid ester other than o-phthalic acid ester or ether.

The specific examples of the o-phthalic acid ester include diethyl o-phthalate, dipropyl o-phthalate, di-n-butyl o-phthalate, diisobutyl o-phthalate, diamyl o-phthalate, dihexyl o-phthalate, diheptyl o-phthalate, dioctyl o-phthalate and any combination thereof, wherein di-n-butyl o-phthalate and diisobutyl o-phthalate are preferred.

The specific examples of the mono- or poly-carboxylic acid ester other than o-phthalic acid ester include diethyl malonate, dibutyl malonate, diethyl adipate, dibutyl adipate, diethyl sebacate, dibutyl sebacate, diethyl maleate, di-n-butyl maleate, diethyl p-phthalate, dipropyl p-phthalate, diisopropyl p-phthalate, dibutyl p-phthalate, diamyl p-phthalate, dihexyl p-phthalate, diheptyl p-phthalate, dioctyl p-phthalate, diethyl m-phthalate, dipropyl m-phthalate, diisopropyl m-phthalate, dibutyl m-phthalate, diamyl m-phthalate, dihexyl m-phthalate, diheptyl m-phthalate, dioctyl m-phthalate, diethyl naphthalene dicarboxylate, dibutyl naphthalene dicarboxylate, triethyl trimellitate, tributyl trimellitate, trioctyl trimellitate, triethyl hemimellitate, tributyl hemimellitate, tetraethyl pyromellitate, tetrabutyl pyromellitate and any combination thereof, wherein dibutyl p-phthalate, dioctyl p-phthalate, tributyl trimellitate and trioctyl trimellitate are preferred.

The specific examples of the ether include di-n-butyl ether, di-iso-butyl ether, di-isoamyl ether, di(2-ethyl-hexyl) ether and any combination thereof, wherein di-iso-amyl ether is preferred.

The amount of the o-phthalic acid ester used is from 0.10 to 0.90 moles, based on per mole of the mixed electron-donor.

The preparation of the catalyst component of this invention may refer to U.S. Pat. No. 4,784,983 and thus is briefly described as follows.

(1) Preparation of the Halide of Magnesium Solution

The particle size of the halide of magnesium used is preferred to be such that it is easily dissolved with stirring. The dissolution temperature is about 0° C.–100° C., preferably from 30° C.–70° C. Inert diluents such as hexane, heptane, octane, benzene, toluene, xylene, 1,2-dichloroethane, chlorobenzene and other hydrocarbons or halohydrocarbons can be added into the solvent system. The amount of epoxy compounds added is about 0.2–10.0 moles, preferably 0.5–4.0 moles, per mole of halide of magnesium, and the amount of organic phosphorus compounds added is about 0.1–3.0 moles, preferably 0.3–1.0 moles, per mole of halide of magnesium.

(2) Precipitation of the Solid

The halide of magnesium solution is maixed liquid titanium tetrahalide to form a solid precipitate in the presence of an auxiliary precipitant at −40° C.~0° C. The mixed electron-donor may be added before or after the precipitation of the solid and loaded on the solid.

According to the invention, the auxiliary precipitant can be added either after the halide of magnesium solution is obtained or together with the halide of magnesium. The liquid titanium tetrahalide or its derivatives can be in the pure liquid state, or in a solution of inert diluents.

The mole ratios of various components per mole the halide of magnesium are as follow: titanium halide, 0.5–150, preferably 1–20, auxiliary precipitant, 0.03–1.0, preferably 0.05–1.4 and mixed electron-donor, 0.02–0.40, preferably 0.05–0.2.

(3) Treatment and Washing of the Solid Precipitate

The solid precipitate is first separated from the mixture. In the solid precipitate thus obtained is entrained a variety of complexes and impurities, so that further treatment is necessary.

The solid precipitate are treated with titanium tetrahalide or a mixture of titanium tetrahalide and an inert diluent and then washed with an inert diluent.

The catalyst component of this invention comprises: 0.5–5% by mole of titanium, 10–30% by mole of magnesium, 30–70% by mole of halogen, and 20–25% by mole of mixed electron-donor.

Component (B) used in the catalyst of this invention is an organic aluminum compound having the formula $AlR_{n'}X_{3-n'}$ wherein each R is independently hydrogen, or a hydrocarbon group having 1–20 carbon atoms, preferably an alkyl, aralkyl or aryl group; X is a halogen, preferably chlorine or bromine; and n' is a number of from 1 to 3. Examples of the compounds are trialkyl aluminums such as trimethyl aluminum, triethyl aluminum, tri-isobutyl aluminum and trioctyl aluminum; hydrogenated alkyl aluminums such as diethyl aluminum hydride and di-isobutyl aluminum hydride; halogenated alkyl aluminums such as diethyl aluminum chloride, di-isobutyl aluminum chloride, sesquiethyl aluminum sesquichloride and ethyl aluminum dichloride; with triethyl aluminum and tri-isobutyl aluminum being preferred.

Component (C) used in the catalyst of this invention is an organic silicon compound having the formula $R_{n'}Si(OR')_{4-n'}$ wherein n' is an integer of from 0 to 3; R and R' each is independently is alkyl, cycloalkyl, aryl, or haloalkyl group. Examples of such compounds are trimethyl methoxysilane, trimethyl ethoxysilane, methyl cyclohexyl dimethoxy silane, dibutyl dimethoxy silane, dimethyl dimethoxysilane, dimethyl diethoxysilane, diphenyl dimethoxysilane, diphenyl diethoxysilane, phenyl triethoxysilane, pheyl trimethoxysilane, and the like.

In the catalyst system of the invention, the molar ratio of aluminium in component (B) to titanium in component (A) is from 5 to 1000, preferably from 100 to 800, and the molar ratio of silicon in component (C) to titanium in component (A) is from 2 to 100, preferably from 8 to 32.

Components (B) and (C) have been disclosed in U.S. Pat. No. 4,784,983 which is incorporated herein by reference.

It is suitable to employ the catalyst of this invention in the polymerization of α-olefins, e.g. ethylene, propylene, 1-butylene, 4-methyl-1-pentene, 1-hexylene, 1-octylene and the like. Homopolymerization as well as atactic copolymerization and block copolymerization of these olefins can be carried out using the catalyst system of the resent invention. Conjugated diene or nonconjugated diene can be selected as a monomer in copolymerization.

Liquid-phase polymerization and gas-phase polymerization can both be employed. An inert solvent selected from saturated aliphatic or aromatic hydrocarbons such as hexane, heptane, cyclohexane, naphtha, extract oil, hydrogenated gasoline, kerosene, benzene, toluene and xylene can be used as the reaction medium in liquid-phase polymerization. The olefin itself can also act as the reaction medium. Prepolymerization can be conducted before polymerization. Polymerization can be carried out in batch mode, semi-continuous or continuous mode.

The polymerization takes place at a temperature ranging from room temperature to about 150° C., preferably from about 50° C. to 100° C. Hydrogen gas can be used as a molecular weight regulator.

In order that the invention may be more fully understood, the following Examples and Comparative Examples are given by way of illustration only.

EXAMPLE 1

1. Preparation of Solid Catalyst Component (A):

Anhydrous magnesium chloride (0.05 mol), toluene (95 ml), epoxy chloropropane (EPC) (0.05 mol) and tributyl phosphate (TBP) (0.046 mol) were introduced into a reactor which has thoroughly been purged with highly purified nitrogen. The temperature was raised to 50° C. with stirring, and the mixture was then maintained at that temperature for 2.5 hours, while the solids were dissolved completely. Phthalic anhydride (0.0095 mol) was added to the solution, and then the solution was maintained for an additional 1 hour at 50° C. The solution was cooled to −25° C. Then titanium tetrachloride (56 ml) was added dropwise over a course of 1 hour. The solution was heated to 80° C., while a solid product is precipitated. Dibutyl Phthalate (0.0028 mol) and trioctyl trimellitate (0.0028 mol) were added and the mixture was maintained at the temperature of 80° C. for 1 hour. The solid portion was collected by filtration and washed with toluene (2×100 ml). A brown-yellow solid precipitate was obtained. The solid was then treated with toluene (60 ml) and titanium tetrachloride (40 ml) for 2 hours at 90° C. After the filtrate was removed, the treatment step is repeated. The solid was washed with toluene (3×100 ml), and then with hexane (2×100 ml) to obtain 5.9 g of a solid which contained 2.8% by weight of titanium, 6.5% by weight of dibutyl phthalate, and 7.8% by weight of trioctyl trimellitate.

2. Liquid Phase Bulk Polymerization

Triethyl aluminum (0.0025 mol), methyl cyclohexyl dimethoxysilane (0.0001 mol) and solid catalyst component (A) (10 mg) prepared as above were introduced into a 5-liter stainless steel autoclave which has been thoroughly purged with propylene. After introducing 2.5 L propylene and 2000 ml hydrogen, the temperature was raised to 70° C. Propylene was polymerized for 2 hours. The activity stereospecificity, and bulk density of the resulting polymer were 52.1 kg PP/g cat, 98.2% and 0.45 g/ml, respectively. The molecular weight distribution of the resulting polymer was shown in Table 1.

EXAMPLE 2

Example 1 was followed except that dibutyl phthalate (0.0028 mol) and trioctyl trimellitate (0.0028 mol) was changed to dibutyl phthalate (0.0028 mol) and dioctyl p-phthalate (0.0028 mol) to obtain 5.2 g of a solid which contained 2.1% by weight of titanium, 6.2% by weight of dibutyl phthalate, and 4.9% by weight of trioctyl trimellitate. The molecular weight distribution of the resulting polymer was shown in Table 1.

Comparative Examples 1

Example 1 was followed except that dibutyl phthalate (0.0028 mol) and trioctyl trimellitate (0.0028 mol) was changed to dibutyl phthalate (0.0056 mol). The molecular weight distribution of the resulting polymer was shown in Table 1.

EXAMPLE 3

Example 1 was followed except that dibutyl phthalate (0.0028 mol) and trioctyl trimellitate (0.0028 mol) was changed to diisobutyl phthalate (0.0028 mol) and dipropyl p-phthalate (0.0028 mol). The molecular weight distribution of the resulting polymer was shown in Table 1.

Comparative Example 2

Example 1 was followed except that dibutyl phthalate (0.0028 mol) and trioctyl trimellitate (0.0028 mol) was changed to diisobutyl phthalate (0.0056 mol). The molecular weight distribution of the resulting polymer was shown in Table 1.

TABLE 1

| Example No. | Type of the electron-donor | amount of the electron-donor (mol) | molecular weight distribution of polypropylene Mw/Mn |
| --- | --- | --- | --- |
| Example 1 | Dibutyl phthalate | 0.0028 | 7.7 |
|  | trioctyl trimellitate | 00028 |  |
| Example 2 | Dibutyl phthalate | 0.0028 | 7.5 |
|  | Dioctyl p-phthalate | 0.0028 |  |
| Example 3 | diisobutyl phthalate | 0.0028 | 6.9 |
|  | dipropyl p-phthalate | 0.0028 |  |
| Comparative Example 1 | Dibutyl phthalate | 0.0056 | 4.8 |
| Comparative Example 2 | diisobutyl phthalate | 0.0056 | 4.9 |

The data from Table 1 show that the molecular weight distribution of the polymer obtained by using the catalyst containing the mixed electron-donor is broader than that by using the catalyst containing the single electron-donor.

EXAMPLE 4

Example 1 was followed except that dibutyl phthalate (0.0028 mol) and trioctyl trimellitate (0.0028 mol) was changed to diisobutyl phthalate (0.0038 mol) and dioctyl p-phthalate (0.0018 mol). The stereospecificity of the resulting polymer was shown in Table 2.

EXAMPLE 5

Example 1 was followed except that dibutyl phthalate (0.0028 mol) and trioctyl trimellitate (0.0028 mol) was changed to diisobutyl phthalate (0.0028 mol) and dioctyl p-phthalate (0.0028 mol). The stereospecificity of the resulting polymer was shown in Table 2.

EXAMPLE 6

Example 1 was followed except that dibutyl phthalate (0.0028 mol) and trioctyl trimellitate (0.0028 mol) was changed to diisobutyl phthalate (0.0018 mol) and dioctyl p-phthalate (0.0038 mol). The stereospecificity of the resulting polymer was shown in Table 2.

EXAMPLE 7

Example 1 was followed except that dibutyl phthalate (0.0028 mol) and trioctyl trimellitate (0.0028 mol) was changed to diisobutyl phthalate (0.0028 mol) and diamyl p-phthalate (0.0028 mol). The stereospecificity of the resulting polymer was shown in Table 2.

EXAMPLE 8

Example 1 was followed except that trioctyl trimellitate (0.0028 mol) was changed to di-isoamyl ether (0.0020 mol) and the polymerization time was changed to 1 hour. The activity and stereospecificity of the resulting polymer were 41.0 kg PP/g cat and 97.8%, respectively.

Comparative Examples 3–5

Example 1 was followed except that dibutyl phthalate (0.0028 mol) and trioctyl trimellitate (0.0028 mol) was changed to dioctyl p-phthalate (0.0056 mol), dipropyl p-phthalate (0.0056 mol) and diamyl p-phthalate (0.0056 mol), respectively. The stereospecificity of the resulting polymers was shown in Table 2.

TABLE 2

| Example No. | Type of the electron-donor | Amount of the electron-donor (mol) | Stereo-specificity of polypropylene (%) |
|---|---|---|---|
| Example 4 | diisobutyl phthalate | 0.0038 | 99.0 |
|  | dioctyl p-phthalate | 0.0018 |  |
| Example 5 | diisobutyl phthalate | 0.0028 | 98.2 |
|  | dioctyl p-phthalate | 0.0028 |  |
| Example 6 | diisobutyl phthalate | 0.0018 | 97.0 |
|  | dioctyl p-phthalate | 0.0038 |  |
| Example 3 | diisobutyl phthalate | 0.0028 | 97.8 |
|  | dipropyl p-phthalate | 0.0028 |  |
| Example 7 | diisobutyl phthalate | 0.0028 | 98.5 |
|  | diamyl p-phthalate | 0.0028 |  |
| Comparative Example 2 | diisobutyl phthalate | 0.0056 | 99.5 |
| Comparative Example 3 | dioctyl p-phthalate | 0.0056 | 93.4 |
| Comparative Example 4 | dipropyl p-phthalate | 0.0056 | 92.5 |
| Comparative Example 5 | diamyl p-phthalate | 0.0056 | 94.0 |

The data of comparative examples from Table 2 show the stereospecificity of the polymers obtained by using the single electron-donor is either too high or too low. The application of such polymer would be limited.

As a rule, when the type of the electron-donor in the catalyst is given, the stereospecificity of the resulting polymer is correspondingly given. In order to adjust the stereospecificity of the resulting polymer, it is necessary to adjust the ratio of the organic aluminum compound to the organic silicon compound during the polymerization. However, the effect of this manner is not ideal.

It is found that the stereospecificity of the resulting polymer can be adjusted by using the catalyst containing the mixed electron-donors.

What is claimed is:

1. A catalyst component for the (co)polymerization of olefins comprising titanium, magnesium, halogen and a mixed electron-donor and prepared by dissolving a halide of magnesium in a solvent system consisting of an organic epoxy compound, an organic phosphorus compound and optionally an inert diluent to form a homogeneous solution; mixing the homogeneous solution with titanium tetrahalide or a derivative thereof to form a mixture; precipitating a solid from the mixture in the presence of at least one auxiliary precipitant; treating the solid with the mixed electron-donor to load the mixed electron-donor on the solid; and treating the mixed electron-donor loaded solid with titanium tetrahalide or a derivative thereof and the inert diluent, wherein the mixed electron-donor consists of (1) an o-phthalic acid ester, and (2) a mono- or poly-carboxylic acid ester other than o-phthalic acid ester or ether and the amount of the mixed electron-donor is from 0.02 to 0.40 moles per mole of the halide of magnesium.

2. The catalyst component according to claim 1, characterized in that said halide of magnesium is selected from magnesium halide, a complex of magnesium halide with water or alcohol; a derivative of magnesium halide wherein a halogen atom is substituted by a hydrocarboxyl or halo-hydrocarboxyl group and any combination thereof.

3. The catalyst component according to claim 1, characterized in that said organic epoxy compound is selected from oxides of aliphatic olefins, aliphatic diolefins, halogenated aliphatic olefins, and halogenated aliphatic diolefins, glycidyl ethers, cyclic ethers and any combination thereof.

4. The catalyst component according to claim 1, characterized in that said organic phosphorus compound is hydrocarbyl or halohydrocarbyl esters of phosphoric acid or phosphorous acid.

5. The catalyst component according to claim 1, characterized in that said halide or titanium is a compound having the formula TiXn(OR)4−n wherein X is a halogen, each R is independently a hydrocarbyl and n is an integer of from 0 to 4 and the amount of the halide of titanium is from 0.5 to 150 moles, based on per mole of the halide of magnesium.

6. The catalyst component according to claim 5, characterized in that said halide of titanium is titanium tetrachloride, titanium tetrabromide, titanium tetraiodide, tetrabutoxy titanium, tetraethoxy titanium, chlorotriethoxy titanium, dichlorodiethoxy titanium, trichloroethoxy titanium and any combination thereof.

7. The catalyst component according to claim 1, characterized in that said auxiliary precipitant is selected from organic acid anhydrides, organic acids, ketones, ethers and any combination thereof, and the amount of the auxiliary precipitant is from 0.03 to 1.0 moles, based on per mole of the halide of magnesium.

8. The catalyst component according to claim 1, characterized in that the amount of o-phthalic ester is from 0.10 to 0.90 per mole of the mixed electron-donor.

9. The catalyst component according to claim 8, characterized in that said o-phthalic acid ester is selected from diethyl o-phthalate, dipropyl o-phthalate, di-n-butyl o-phthalate, diisobutyl o-phthalate, diamyl o-phthalate, dihexyl o-phthalate, diheptyl o-phthalate, dioctyl o-phthalate and any combination thereof.

10. The catalyst component according to claim 8, characterized in that said o-phthalic acid ester is di-n-butyl o-phthalate or diisobutyl o-phthalate.

11. The catalyst component according to claim 8, characterized in that said mono- or poly-carboxylic acid ester other than o-phthalic acid ester is p-phthalate or m-phthalate.

12. The catalyst component according to claim 8, characterized in that said mono- or poly-carboxylic acid ester other than o-phthalic acid ester is selected from diethyl malonate, dibutyl malonate, diethyl adipate, dibutyl adipate, diethyl sebacate, dibutyl sebacate, diethyl maleate, di-n-butyl maleate, diethyl p-phthalate, dipropal p-phthalate, diisopropyl p-phthalate, dibutyl p-phthalate, diamyl p-phthalate, dihexyl p-phthalate, diheptyl p-phthalate, dioctyl p-phthalate, diethyl m-phthalate, dipropyl m-phthalate, diisopropyl m-phthalate, dibutyl m-phthalate, diamyl m-phthalate, dihexyl m-phthalate, diheptyl m-phthalate, dioctyl m-phthalate, diethyl naphthalene dicarboxylate, dibutyl naphthalene dicarboxylate, triethyl trimellitate, p-tributyl trimellitate, trioctyl trimellitate, triethyl hemimellitate, tributyl hemimellitate, tetraethyl pyromellitate, tetrabutyl pyromellitate and any combination thereof.

13. The catalyst component according to claim 12, characterized in that said mono- or poly-carboxylic acid ester other than o-phthalic acid ester is dibutyl p-phthalate, dioctyl p-phthalate, tributyl trimellitate, trioctyl trimellitate or any combination thereof.

14. The catalyst component according to claim 8, characterized in that said ether is selected from di-n-butyl ether, di-iso-butyl ether, di-iso-amyl ether, di(2-ethyl-hexyl)ether and any combination thereof.

15. The catalyst component according to claim 14, characterized in that said ether is di-isoamyl ether.

16. The catalyst component according to claim 9, characterized in that the amount of the mixed electron-donor is from 0.05 to 0.20 moles, based on per mole of the halide of magnesium.

17. The catalyst component according to claim 8, characterized in that the amount of the o-phthalic acid ester used is from 0.10 to 0.90 moles, based on per mole of the mixed electron-donor.

18. A catalyst for the (co)polymerization of olefins comprising:
(A) A catalyst component according to claim 1;
(B) An organic aluminum compound having the formula $AlR_nX_{3-n}$ wherein each R is independently hydrogen or a hydrocarbyl group having 1–20 carbon atoms, X is a halogen, and n is a number of from 1 to 3; and
(C) An organic silicon compound having the formula $R_{n'}Si(OR')_{4-n'}$ wherein n' is an integer of from 0 to 3; R and R' each is independently is alkyl, cycloalkyl, aryl, or haloalkyl group.

19. The catalyst for the (co)polymerization of olefins according to claim 18, wherein the ratio of component (B) to component (A) is, measured as the molar ratio of aluminum to titanium, from 5 to 1000, and the ratio of component (C) to component (B) is, measured as the molar ration of silicon to aluminum, from 0.0025 to 1.0.

20. The catalyst component according to claim 1, wherein the homogeneous solution is mixed with a titanium component consisting essentially of titanium tetrahalide or a derivative thereof.

* * * * *